United States Patent [19]

Magg et al.

[11] 4,054,265
[45] Oct. 18, 1977

[54] DEVICE FOR GRIPPING ROPES, CABLES OR WIRES

[76] Inventors: Rudolf Magg, Argenstrasse 2; Gotz Siegmann, Rosenstr. 4, both of Kressbronn, Germany, 7993

[21] Appl. No.: 640,327

[22] Filed: Dec. 12, 1975

[30] Foreign Application Priority Data

Jan. 10, 1975 Germany .............................. 2500731

[51] Int. Cl.² .......................................... A01K 73/06
[52] U.S. Cl. ........................................ 254/138; 43/8; 74/230.24
[58] Field of Search ................... 254/190 R, 191, 138, 254/135 R; 74/230.24, 230.23, 230.5, 230.11, 230.19; 43/8

[56] References Cited

U.S. PATENT DOCUMENTS

| 783,310 | 2/1905 | Reed | 74/230.23 |
|---|---|---|---|
| 2,802,366 | 8/1957 | Borner | 74/230.24 |
| 3,231,240 | 1/1966 | Naito | 254/191 |
| 3,375,725 | 4/1968 | Mathison | 74/230.24 |
| 3,643,921 | 2/1972 | Puretic | 74/230.24 |
| 3,881,361 | 5/1975 | Newell | 74/230.24 |
| 3,965,767 | 6/1976 | Rinio | 74/230.24 |

FOREIGN PATENT DOCUMENTS

364,693  11/1938  Italy .............................. 74/230.24

*Primary Examiner*—Robert J. Spar
*Assistant Examiner*—Kenneth Noland
*Attorney, Agent, or Firm*—McGlew and Tuttle

[57] ABSTRACT

The device is in the nature of a winch, particularly for use on sailing yachts as a sheet or anchor winch, and in which the rope or the like to be gripped is guided over a driven member comprising two conical discs operatively coupled to each other and having their conical surfaces facing each other and opening around the entire periphery of the driven member. A drive shaft is operable to rotate the discs, and at least one conical disc and preferably both conical discs, are mounted for rotation about respective axes fixedly inclined relative to the axis of the drive shaft. Thereby the discs conjointly define, along a part of their circumferences, a wedge-shape opening for the rope to be gripped or clamped. The discs are rotatably supported on respective mounting plates which are secured to each other and to a suitable support surface, such as the deck of a yacht. The discs may be in the form of internal ring gears meshing with pinions secured to the drive shaft, or the discs may be in the form of external gears meshing with pinions secured to the drive shaft. In one embodiment of the invention, the discs are internal ring gears meshing with an externally geared drive ring having an arcuate periphery and having teeth on its internal surface engaging one or more planetary pinions meshing with a pinion secured to the drive shaft. The facing conical surfaces of the discs may be formed with friction producing configurations.

17 Claims, 6 Drawing Figures

DEVICE FOR GRIPPING ROPES, CABLES OR WIRES

FIELD AND BACKGROUND OF THE INVENTION

The present invention relates to a device for gripping ropes, cables, or wires, in the nature of a rope winch, in which the rope to be gripped is guided over a manually or mechanically driven member comprising two conical discs which are firmly or operatively connected to each other and have surfaces facing each other. The inventive device may be used with particular advantage on sailing yachts as a sheet or anchor winch.

Winches, by means of which, with the aid of a rope, chain, or similar pulling means wound on a drivable drum, loads can be elevated or drawn near, are well known in a plurality of various designs and successfully used in almost all technological fields. In many cases, the drum is of cylindrical shape. However, there are also known designs in which the driven member of the gripping device comprises two conical discs firmly connected to each other which are mutually parallel and have their conical surfaces facing each other so that the rope to be gripped or clamped can be fitted into the circular, wedge-shape, groove thus formed.

In all of these designs of winches, the pulling means is retained by engagement in a toothing, by contact friction on the cylindrical drum or between the conical discs, or by fixing the rope, so that, in order to ensure a satisfactory frictional force even under high loads, the rope sometimes must be wound about the drum several times.

Rope and cable winches are preferably used also on ships, particularly on sailing yachts, as sheet or anchor winches, in order to be able to apply the high forces necessary for moving sails, traps, or anchors. In all of these known winch constructions, which are frequently also provided with locking mechanisms in the form of ratchets or brakes serving to prevent a slipping back of the drum, it is necessary to pass the rope once or several times about the drum or the conical discs for obtaining the needed friction. Then, during the veering, i.e., loosening of the sheet, several turns of the sheet must be taken from the drum and the sheet can be veered only if the rope slips on the drum. In most cases, this operation takes too much time so that, in races, precious time elapses unused until the sail is brought into the desired position. In addition, the risk that the rope or sheet becomes twisted is very high. Further, winches used up to date have the disadvantage of not allowing a quick operation by a single person. On the contrary, one crew member has to haul the rope close and another has to actuate the crank for driving the drum.

SUMMARY OF THE INVENTION

The present invention is directed to a device for gripping ropes, cables, or wires in which the drawbacks of the known designs of winches are eliminated and which makes it possible, in a most simple manner and without great expense, to grip a rope or another pulling means most reliably and loosen it immediately again, without the necessity of passing the rope several times around a drum or conical discs. In addition, even under the necessity of applying strong forces, the device should be easily operable by a single person and, in use on ships, the possibility should be given of veering the rope slowly and continuously without problems and without the rope slipping on the drum, or of slacking it suddenly by a definite length.

This objective is attained by means of a gripping device in which the rope to be gripped is guided over a manually or mechanically driven member comprising two conical discs firmly or operatively connected to each other and with their conical surfaces facing each other and in which, in accordance with the invention, one or both of the conical discs are mounted with their axes of rotation fixedly inclined relative to the axis of a drive shaft and in a manner such that, with the inclination of one or both discs, the discs form, along a part of their circumferences, a wedge-shape opening for the rope to be gripped or clamped.

It is advisable to insert the discs between two plates which are adapted to be braced relative to each other and, preferably, provided with recesses for receiving the discs which are supported therein by means of anti-friction bearings. It is useful to give the recesses a shape which is rotationally symmetrical of the axes of rotation of the discs.

Advantageously, for driving the discs, each disc comprises a centric circular recess and the interior surfaces are provided with teeth meshing with a gear carried by the drive shaft which is mounted eccentrically of the recesses, or with a driving ring having external teeth for transmitting the motion from the drive shaft.

In case a driving ring is used for transmitting the motion to the discs, it is suitable to dispose the ring between the plates and, preferably, to mount it thereon for rotation and, in addition, to design the ring with a crowned or spherical exterior surface provided with the mentioned external teeth, so that the discs are automatically held on the ring in their oblique position. For driving the ring, its interior surface may be provided with teeth engaging directly, or through intermediate members, with the drive shaft.

In a variant of the embodiment, the discs may be mounted for rotation on sleeves or similar component parts which are inclined relative to each other and each disc may be provided, on its external surface, with teeth meshing with a gear which is drivable by means of a crank or a drive motor.

In order to increase the frictional resistance, it is further advantageous to provide each of the discs, on the entire or a partial area of its conical surface, with a non-skid friction lining, sets of teeth extending radially, or tangentially to a base circle, a nap pattern, or the like. Further, the gripping device may also be associated with a device for automatically locking the discs.

A device for gripping ropes, cables or wires, designed in accordance with the invention, is not only extremely simple in its construction and, therefore, easy to manufacture at low expenses, but also reliable in service, easy to handle and versatile in use. That is, since the gripping device is formed of two conical, drivable, discs mounted for rotation in inclined position relative to the drive axis so that the rope is received in a wedge-shape opening, the rope is automatically pulled into the wedge-shape opening by the gripping force and fixedly retained therein. Thus, only a single person is needed for the operation, who may both insert the rope and actuate the crank.

A slippage of the rope is impossible since the clamping of the rope between the wedge-shape discs increases with the gripping force. Because of the design provided, and since the rope applies against the winch only through half a turn, an entanglement is not possible either.

In consequence, while using the inventive gripping or clamping device on a sailing yacht, it is easily possible to loosen the entire rope instantly as well as to slack it away slowly and continuously or to ease if off by a definite length. Thus, particularly for hauling in a sheet, not only one less operator is needed as compared to the methods used up to date, but, what is most important, a more accurate veering and hauling without difficulties is made possible.

Therefore, the inventive device is usable in most various applications for gripping pulling means, such as ropes, cables, wires and even fine-link chains, including endless pulling means, and may be used in many cases also as a winch. At the same time, the susceptibility of the device to disturbances is small, its reliability in service is high, and its operation is simple since all that is necessary is to insert the pulling means to be gripped between the drivable, mutually inclined, conical discs.

An object of the invention is to provide an improved device for gripping or clamping ropes, cables or wires in which the drawbacks of the known designs of winches are eliminated.

Another object of the invention is to provide such a device which makes it possible, in a simple manner and at a low cost, to grip a rope or the like reliably and loosen it immediately again.

A further object of the invention is to provide such a gripping or clamping device which is easily operable by a single person.

For an understanding of the principles of the invention, reference is made to the following description of typical embodiments thereof as illustrated in the accompanying drawings:

DESCRIPTION OF THE PREFERRED EMBODIMENTS

Figure 1:
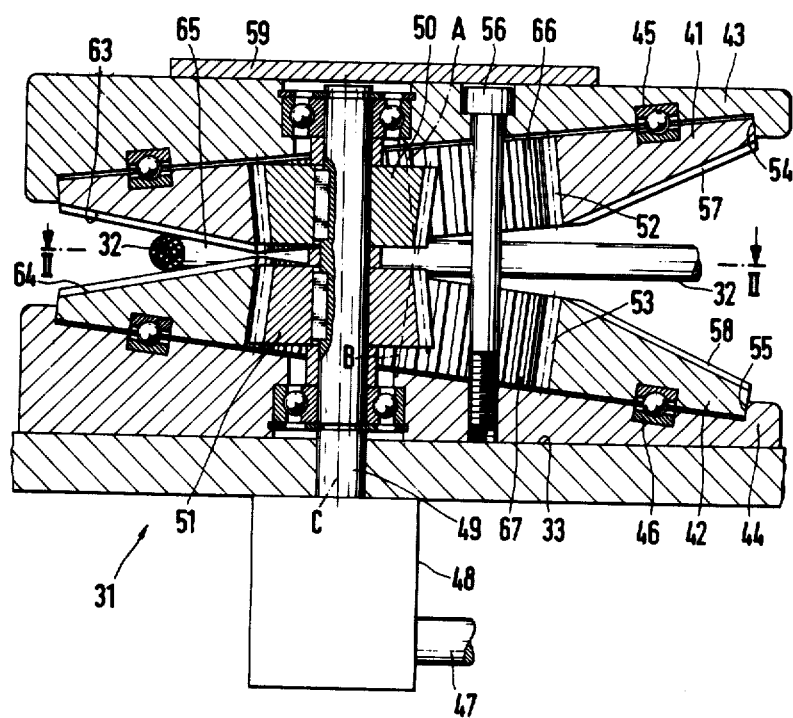
FIG. 1 shows one embodiment of the gripping device comprising two discs mounted in mutually inclined position and supported in plates.

The device for gripping a rope 32, shown in FIG. 1 and generally designated 31, substantially comprises two conical discs 41 and 42 which receive their motion from a drive shaft 49. Discs 41 and 42 are provided with conical surfaces 63 and 64 and are inserted in respective plates 43 and 44 wherein respective recesses 54, 55 are provided for their accommodation. In the present example, plate 44 is secured, for example, to a deck 33 of a ship. For supporting the rotatable discs 41 and 42 on plates 43, 44, embedded anti-friction bearings 45, 46 are provided.

The respective axes of rotation A and B of discs 41 and 42 are inclined relative to the axis C of shaft 49, so that the wedge-shape opening 65, formed by conical surfaces 63, 64 and serving to receive rope 31 or a sheet, extends through only a part of the circumference and remains permanently at the same location, even during rotation of discs 41, 42.

For imparting a rotary motion thereto, discs 41 and 42 are provided with circular recesses 66, 67 and internal teeth 52, 53 thereon which mesh with bevel gears 50, 51 nonrotatably mounted on drive shaft 49. Shaft 49 is mounted eccentrically of discs 41 and 42 and connected, through a transmission 48, to the output shaft 47 of a motor (not shown) or another drive mechanism. Plates 43, 44, carrying discs 41, 42, are firmly braced against each other by means of screws 56 extending through the central recesses of the discs, so that the forces exerted by sheet 32 are absorbed by the deck 33. The bearing area of drive shaft 49 is covered by a plate 59.

In order to drive discs 41, 42 in synchronism, it is possible, of course, instead of providing gears 50, 51, to transmit the motion of shaft 49 to only one of discs 41, 42 and to design the teeth 57, 58 thereof for mutual engagement so that the discs are driven in this way. A common drive of discs 41, 42 might be effected also by the contact pressure of sheet 32.

As soon as, with rotating discs 41, 42, sheet 32 is inserted into wedge-shape opening 65, it is automatically pulled against the discs and firmly clamped therebetween. Since opening 65 is flared in the direction of the sheet running in, sheet 32 is not only reliably fixed but also automatically released again. Transmission 48 may be provided with a slipping clutch to avoid a permanent drive of discs 41, 52. Thus, for example, for easing the sheet, only its free end needs to be pulled out of wedge-shape opening 65 in order to let the sheet slip up. For hauling sheet 32 in, on the contrary, upon inserting it into wedge-shape opening 65, the sheet is instantly firmly retained, even if discs 41, 42 are not driven, because it becomes clamped between conical surfaces 63 and 64 of the discs.

Figure 2:
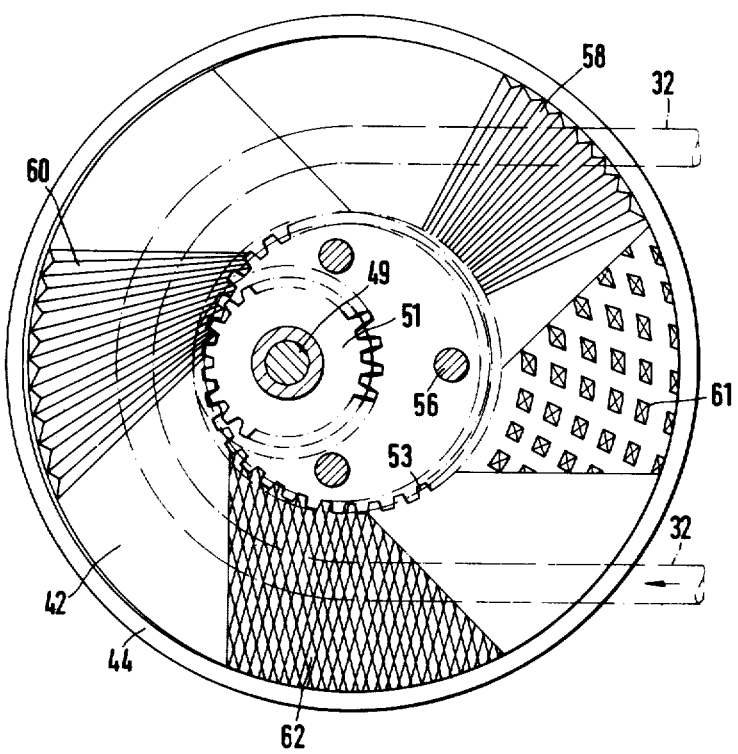
FIG. 2 is a sectional view along the line II—II of FIG. 1 showing various designs of the disc surface.

In order to enhance the clamping, discs 41, 42 may be provided, as shown in FIG. 2, by differently designed portions of the surface, with sets of radially extending teeth 58 or teeth 60 where the teeth extend tangentially to a base circle. It is also possible to provide discs 41, 42 with a nap pattern 61 or with a non-skid coating 62.

Figure 3:
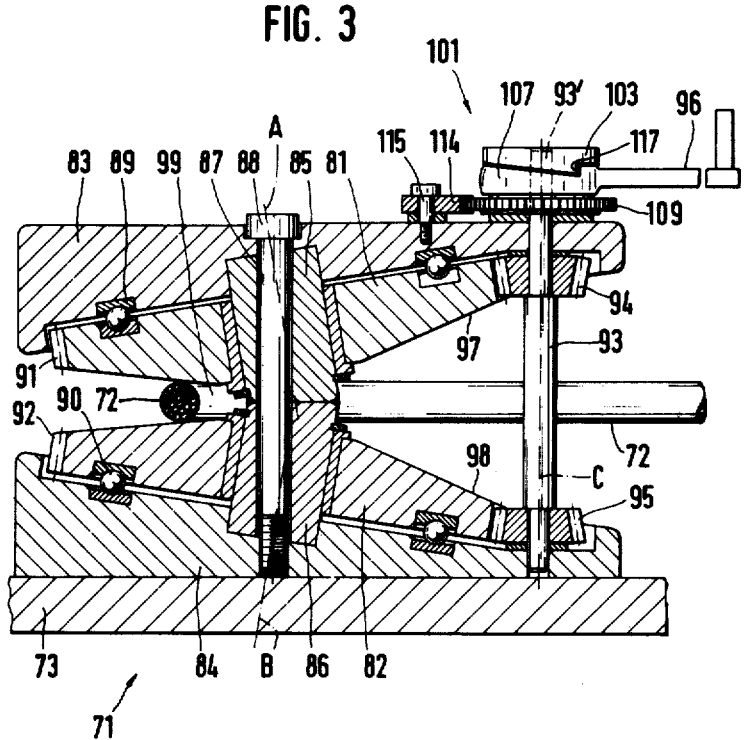
FIG. 3 shows another embodiment of the device in a view similar to FIG. 1.

In the gripping or clamping device 71, shown in FIG. 3, discs 81 and 82, comprising conical surfaces 97, 98, are again inclined relative to axis C of a drive shaft 93 so that the wedge-shape opening 99 thus formed between discs 81, 82 and in which rope 72 or a sheet will be clamped, extends through only a part of the circumference. For supporting discs 81, 82, again plates 83, 84 are provided of which plate 84 is secured to a base plate 73 or to the deck. By means of a tightening screw 88, plates 83 and 84 are braced against each other so that the pulling force exerted by rope 72 is absorbed by plate 73.

In this case, discs 81, 82 are mounted for rotation on bushings 85, 86, which are disposed in inclined position relative to the vertical or the drive axis C and non-rotatably connected to each other, and which form the inclined axes of rotation A and B. In addition, bushings 85, 86 are provided with a through bore 87 through which tightening screw 88 is passed. In this manner, plates 83 and 84, in which discs 81 and 82 are supported by means of antifriction bearings 89 and 90 and which have to absorb the stretching force, are firmly connected to each other.

For driving conical discs 81 and 82, a crank handle 96 is provided which is connected, through a shaft 93, to two bevel gears 94 and 95. Bevel gears 94, 95 mesh with teeth 91, 92 which are provided on the exterior surface of discs 81, 82 so that upon turning crank 96, discs 81 and 82 of gripping or clamping device 71 are rotated and rope 72 inserted in wedge-shape opening 99 is pulled in and firmly retained or gripped.

Figure 5:
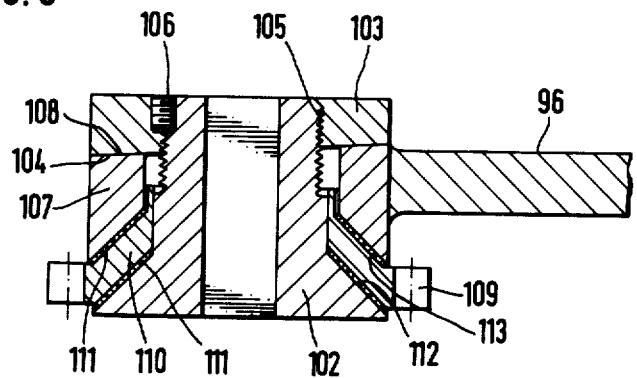
FIG. 5 is a sectional view taken along the line V—V of FIG. 4.

In order to prevent an automatic turning back of discs 81, 82 driven in synchronism, in this example, a mechanism for producing an automatic locking, designated 101 in FIG. 3, is associated with stretching device 71. To this end, as shown particularly in FIG. 5, two sleeves 102 and 103 are non-rotatably mounted on the square end 93' of shaft 93 which is drivable by crank 96, and the sleeves are connected to each other by means of a thread 105 and a screw 106. Sleeve 103 is provided with an oblique surface 104 against which an oblique surface 108 of the hub 107 of crank 96 is applied.

Further, sleeve 102 and hub 107 are each provided with a conical surface 112 and 113, respectively, between which a ratchet wheel 109 is mounted by means of a collar extension 110. Between both collar 110 and sleeve 102 and between collar 110 and hub 107, a plastic ring 11 is inserted. Wheel 109 cooperates with a pawl 114 which is pivotally mounted on a bolt 115 and loaded by a spring 116.

Figure 4:
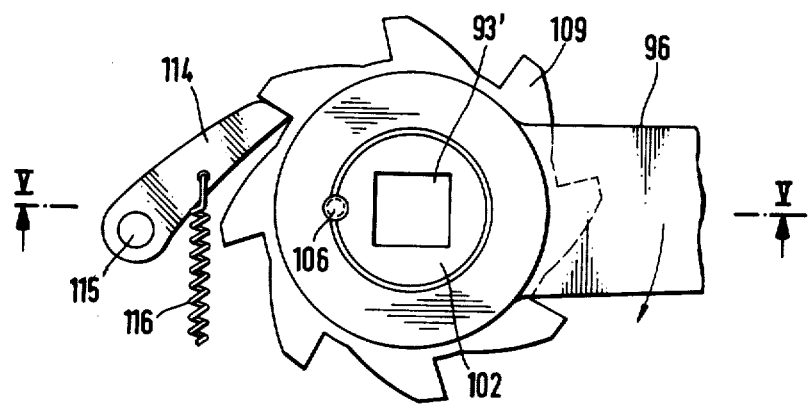
FIG. 4 is a top plan view of the locking mechanism provided in the embodiment of FIG. 3.

Upon turning crank 96 in the direction of the arrow (FIG. 4), ratchet wheel 109 is taken along since collar 110, due to the contact between oblique surface 108 of hub 107 and oblique surface 104 of sleeve 103, is firmly clamped between conical surfaces 112 and 113. In case crank 96 turns back, for example, release pawl 114 engages ratchet wheel 109 so that shaft 93, because of the pressure locking between wheel 109 and sleeve 102, is arrested. If, on the contrary, crank 96 is turned back by hand, an abutment 117 provided on hub 107 takes sleeves 102 and 103 along, in which case the frictional force produced by collar 110 of ratchet wheel 109 must be overcome. Further, since shaft 93 is non-rotatably connected to sleeves 102 and 103, gears 94 and 95, as well as conical discs 81, 82 are also turned against the pulling direction, and rope 72 can be more or less eased off.

Figure 6:
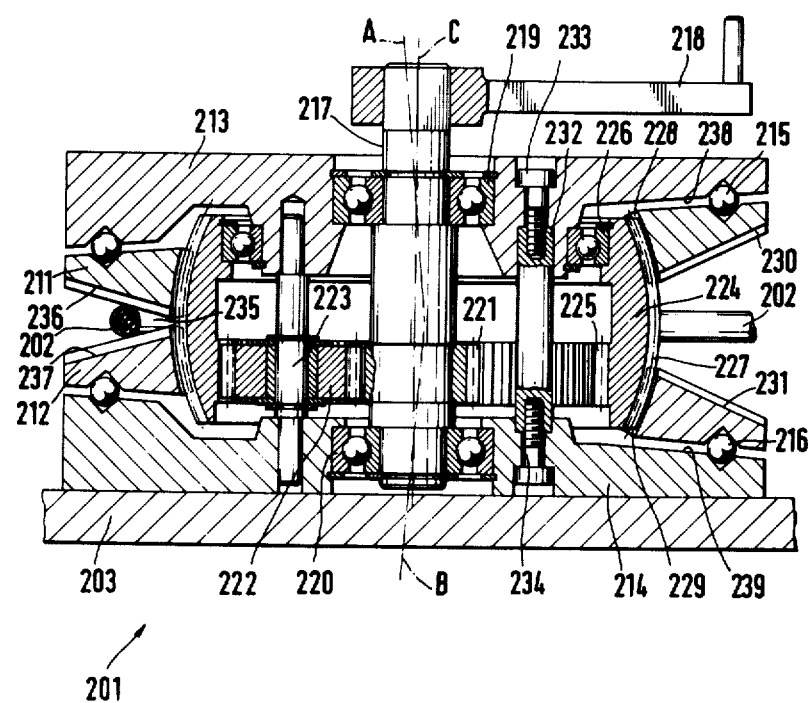
FIG. 6 shows still another embodiment of the device in a view similar to FIG. 1.

The gripping or clamping device shown in FIG. 6, and generally designated 201, also comprises two conical discs 211 and 212 which are supported, by means of anti-friction bearings 215, 216, on respective plates 213, 214 which are provided with surfaces 238, 239 facing each other. By means of bolts 232 inserted in recesses 234 of plates 213, 214 and of tightening screws 233 screwed therein, plates 213, 214 are secured to each other. Since plate 214, in turn, is secured to a deck 203 or another stationary part, the pulling forces exerted on device 201 through rope 202 are absorbed by the stationary part 203.

For driving conical discs 211, 212, a crank 218 is provided and is non-rotatably connected to a shaft 217 which is mounted, by means of anti-friction bearings 219, 220, in plates 213, 214. Shaft 217 carries a gear 221 non-rotatably mounted thereon and meshing with another gear 222 which is mounted for rotation, by means of a bolt 223. Discs 211, 212 are of annular shape, and each of them is provided, on its inside surface, with teeth 228, 229 meshing with external teeth of a drive ring 224 which is drivable, through teeth 225, by gear 222.

Drive ring 225 is rotatably supported on plate 213 by means of an anti-friction bearing 226 and its exterior surface, carrying teeth 227, is spherical or crowned so that conical discs 211, 212, the internal 228, 229 of which are designed as mating teeth, are displaceable in teeth 227 in the axial direction up to their contacting plates 213, 214, and are able to automatically occupy an oblique position under the pulling forces of rope 202. Thus, drive ring 224 acts as an internal gear which is driven, through gear 222 as a planet pinion, by gear 221 as the sun gear. In order to avoid a wedging of the meshing teeth 227, 228 and 229 during the pushing apart of discs 211, 212, it is advantageous to design teeth 227 of drive ring 224 as a hyphoid-tooth system.

If rope 202 is inserted between discs 211, 212, the conical surfaces 236, 237 of which are provided with friction coatings 230, 231, and upon turning crank 218, discs 211, 212 will move into an oblique position relative to axis C of shaft 217, as shown in FIG. 6, as soon as a pulling force is exerted. In this case, respective axes of rotation A and B of discs 211, 212 come into an inclined position relative to axis C so that a wedge-shape opening 235 is formed along a part of the circumferences of discs 211, 212 and rope 202 is pulled therein. Due to the transmitted pulling force, discs 211, 212 are pushed apart and apply, through anti-friction bearings 215, 216, against plates 213, 214.

At the same time, the spherical design of drive ring 224 makes it possible for discs 211, 212, even in their oblique position, to keep meshing contact with the ring so that the motion of crank 218 can still be transmitted to the discs. Wedge-shape opening 235, by means of which rope 202 can be clamped in device 201, remains permanently in the same position, and its cross-sectional shape is determined by the design of contact surfaces 238, 239 of plates 213, 214 as well as by the conical angle of discs 211 and 212. Consequently, an adaptation to respective requirements in each case is easily possible.

The embodiment of the gripping or clamping device 201, shown in FIG. 6, is particularly appreciable because of its rugged and simple construction and a reliable support and mounting of the driven conical discs 211, 212.

While specific embodiments of the invention have been shown and described in detail to illustrate the application of the principles of the invention, it will be understood that the invention may be embodied otherwise without departing from such principles.

What is claimed is:

1. In a device, in the nature of a winch, for gripping ropes, cables and wires, particularly for use on sailing yachts as a sheet and anchor winch, of the type in which the rope to be gripped is guided over a driven member comprising two conical discs operatively coupled to each other and having their conical surfaces facing each other, the improvement comprising, in combination, said two conical discs having their facing conical surfaces opening outwardly, without obstruction to entry of a rope therebetween, around the entire peripheries of said discs; a common drive shaft operable to rotate both said discs; and means mounting said two conical discs for rotation about an axis fixedly inclined relative to the axis of said drive shaft; whereby the discs conjointly define, along a part of their circumferences, a wedge-shaped opening, having a fixed included angle, received ropes of different diameters to be gripped said mounting means comprises two plates; said two conical discs being positioned between and supported by said plates; and means interconnecting said plates against relative movement thereof and extending through said conical discs.

2. In a device, the improvement claimed in claim 1, in which both conical discs are mounted so that their axes of rotation are fixedly inclined relative to the axis of said drive shaft.

3. In a device, the improvement claimed in claim 1, in which said plates are formed with respective recesses each receiving one of said conical discs.

4. In a device, the improvement claimed in claim 3, including anti-friction bearings on said plates rotatably supporting said conical discs.

5. In a device, the improvement claimed in claim 3, in which the recesses in said plates are rotationally symmetrical relative to the axes of rotation of the respective conical discs supported thereon.

6. In a device, the improvement claimed in claim 5, including respective sleeves mounting said discs, the axes of said sleeves being inclined relative to each other and each being coaxial with the axis of rotation of the associated disc; each disc having gear teeth on its external periphery; respective gears meshing with said gear teeth and driving means connected to said gears and operable to rotate the same.

7. In a device, the improvement claimed in claim 6, in which said driving means is a crank.

8. In a device, the improvement claimed in claim 6, in which said driving means includes a drive motor.

9. In a device, the improvement claimed in clam 2, in which each disc has, on at least part of the area of its conical surface, a non-skid coating.

10. In a device, the improvement claimed in claim 2, in which each disc has, on at least part of the area of its conical surface, sets of radially extending teeth.

11. In a device, the improvement claimed in claim 2, in which each disc has, on at least part of the area of its conical surface, a nap pattern.

12. In a device, the improvement claimed in claim 2, including a device operable to automatically lock said discs against rotation.

13. In a device, the improvement claimed in claim 2, in which each disc has a base circle and, on at least part of the area of its conical surface, sets of teeth extending tangentially to said base circle.

14. In a device, the improvement claimed in claim 1, in which each disc is formed with a circular opening therein concentric with its axis of rotation; the inner peripheries of said discs being formed with gear teeth; said drive shaft extending eccentrically of the openings in said discs; and a gear non-rotatably mounted on said drive shaft and meshing with the teeth on the inner peripheries of said discs.

15. In a device, the improvement claimed in claim 1, in which each disc is formed with a circular opening concentric with its axis of rotation; the inner peripheries of said discs being formed with gear teeth; a drive ring having external gear teeth meshing with the internal gear teeth of said discs; and means operatively interconnecting said drive shaft and said drive ring for rotation of said discs.

16. In a device, the improvement claimed in claim 15, including gear teeth on the internal periphery of said drive ring; and gearing rotatable by said drive shaft meshing with the internal gear teeth on said drive ring.

17. In a device, in the nature of a winch, for gripping ropes, cables and wires, particularly for use on sailing yachts as a sheet and anchor winch, of the type in which the rope to be gripped is guided over a driven member comprising two conical discs operatively coupled to each other and having their conical surfaces facing each other, the improvement comprising, in combination, a drive shaft operable to rotate said discs; means mounting at least one conical disc for rotation about an axis inclined relative to the axis of said drive shaft; whereby the discs conjointly define, along a part of their cicumference, a wedge-shape opening for the rope to be gripped; each disc being formed with a circular opening concentric with its axis of rotation; the inner peripheries of said discs being formed with gear teeth; a drive ring having external gear teeth meshing with the internal gear teeth of said discs; means operatively interconnecting said drive shaft and said drive ring for rotation of said discs, said mounting means comprises fixedly coupled plates said drive ring being disposed between said plates; and means mounting said drive ring on said plates for rotation relatively thereto; said drive ring having a spherical external periphery carrying the external gear teeth thereof.

* * * * *